3,746,616
STABILIZED URANIUM OR URANIUM-PLUTONIUM NITRIDE FUEL

James M. Leitnaker, Kingston, and Karl E. Spear II, Oak Ridge, Tenn., assignors to the United States of America as represented by the United States Atomic Energy Commission
Original application Dec. 23, 1969, Ser. No. 887,696. Divided and this application July 20, 1971, Ser. No. 164,430
Int. Cl. G21c 3/06
U.S. Cl. 176—67                 3 Claims

ABSTRACT OF THE DISCLOSURE

A high temperature fuel is provided comprising an oxygen-containing uranium or uranium-plutonium mononitride which forms a separate U-O-N phase under reactor service conditions, wherein the nitrogen equilibrium pressure is at least a factor of 20 less than that of the corresponding oxygen-free mononitride fuel. Stabilization of these fuels with respect to nitrogen release is achieved by incorporating an amount of oxygen in the fuel and reacting the fuel under reactor service conditions to thereby form the U-O-N phase which accommodates within the structure excess nitrogen as it is produced from fuel burnup.

BACKGROUND OF THE INVENTION

This application is a division of our copending application Ser. No. 887,696, filed Dec. 23, 1969, now abandoned.

The invention described herein was made in the course of, or under, a contract with the U.S. Atomic Energy Commission. It relates generally to nitride nuclear reactor fuels and more particularly to a high temperature oxygen-containing uranium or uranium-plutonium mononitride fuel which is stabilized to nitrogen release at reactor service conditions, i.e., exposure to a neutron flux and operating temperatures which are selected for the particular reactor design.

The excellent nuclear and physical properties—fissile density, thermal conductivity, and thermal expansion—of nitrides make them particularly attractive as nuclear fuels. Of the nitride fuels uranium mononitride and uranium-plutonium mononitride appear to be prime candidates for fast breeder fuel. One problem of such fuels, however, is that excess nitrogen is produced during service. This excess nitrogen comes about both through the fissioning of plutonium and the reaction of the nitride fuel with oxygen which may diffuse into the system. Excess nitrogen is undesirable because it reacts with the fuel cladding which is at a temperature of about 800° C. causing embrittlement.

It is therefore an object of this invention to provide an oxygen-containing uranium or uranium-plutonium mononitride fuel which has a lower nitrogen equilibrium pressure than the corresponding oxygen-free mononitride fuel.

Another object is to provide a uranium or uranium-plutonium mononitride composition which is useful as a high temperature fast breeder nuclear fuel, the composition exhibiting minimal reaction with stainless steel cladding.

SUMMARY OF THE INVENTION

The objects and advantages of this invention are realized by the discovery that an oxygen-containing uranium or uranium-plutonium mononitride fuel having a separate U-O-N phase could be formed wherein the nitrogen equilibrium pressure is at least a factor of 20 less than that of the corresponding oxygen-free mononitride fuel. The formation of this separate U-O-N phase, which is stabilized to nitrogen release, unexpectedly provides a nitrogen sink for the accommodation within the nitride structure of excess nitrogen produced as the fuel is burned. Formation of this stabilized U-O-N structure is achieved by providing an amount of oxygen in a uranium or uranium-plutonium mononitride fuel and reacting the fuel at an elevated temperature in a nitrogen atmosphere. Advantageously, the U-O-N phase can be formed during reactor operation under service conditions wherein nitrogen is released by fuel burnup. Applicants demonstrated the formation of this stabilized U-O-N structure by reacting uranium mononitride with uranium dioxide at 1700° C. and one atmosphere nitrogen whereby a uranium sesquinitride phase which, in the absence of any oxygen, would have a decomposition pressure of above 20 atmospheres at 1700° C. was observed upon quenching (within 2 seconds) the sample to room temperature. Thus, the reacted U-O-N structure was found to hold excess nitrogen over and above that necessary to form uranium mononitride. That the U-O-N phase can be stabilized with respect to nitrogen release affords the fabrication of these mononitride fuels into stainless steel clad fuel elements which have minimal cladding-fuel reaction.

DESCRIPTION OF THE PREFERRED EMBODIMENT

Stabilized uranium or uranium-plutonium mononitride fuels, in accordance with this invention, are prepared by incorporating an effective amount of oxygen in a uranium or uranium-plutonium mononitride fuel and reacting the fuel under reactor service conditions. By an "effective amount" of oxygen, it is meant sufficient oxygen to provide within the reacted structure (U-O-N) the nitrogen sink. Suitable oxygen concentrations, which may be provided as uranium dioxide, are from about 2000 p.p.m. to 40,000 p.p.m. When oxygen is present in amounts less than 2000 p.p.m. it dissolves in the uranium mononitride without achieving the stabilizing effect. Above about 40,000 p.p.m. the bulk density and thermal conductivity of the fuel is deleteriously lowered.

The exact mechanism by which the oxygen stabilizes the reacted structure is not completely understood, but it has been found that when sufficient oxygen, which is dissolved in the U-O-N structure, is present with the uranium mononitride and reacted in a nitrogen atmosphere at an elevated temperature, the U-O-N structure will form under conditions where uranium sesquinitride would normally be unstable. Thus, the nitrogen is accommodated within the structure and the nitrogen overpressure, as would be the situation in the absence of oxygen dissolution, is prevented from continuing to increase.

Figure 1:
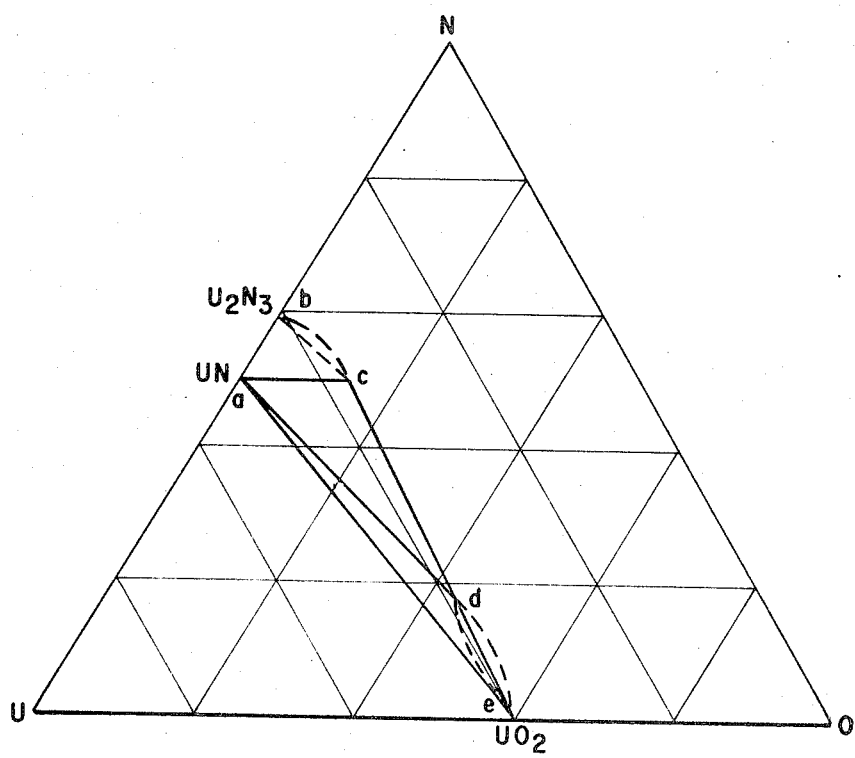
FIG. 1 is a phase diagram of the ternary system uranium, nitrogen, oxygen.
Figure 2:
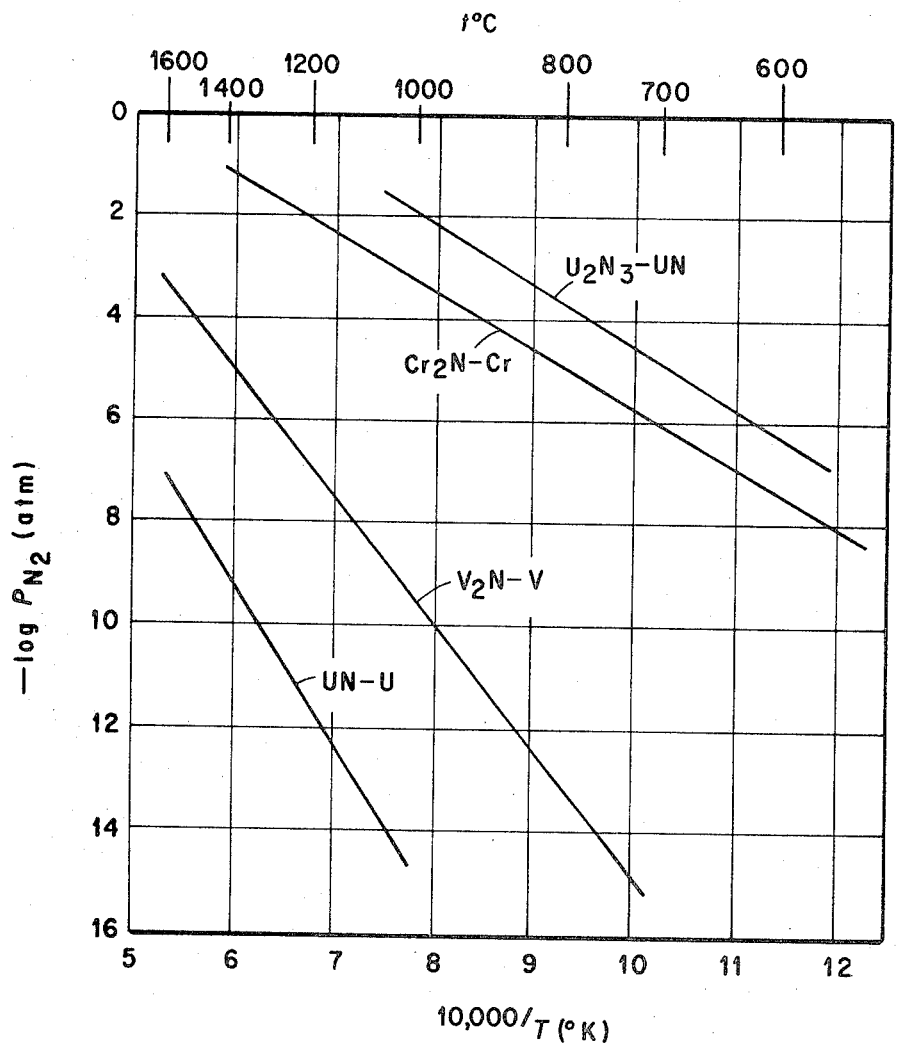
FIG. 2 is a plot of nitrogen equilibrium pressure over various nitride metal systems having the general reaction of $M_xN_{y+2} \rightleftharpoons M_xN_y + N_{2(g)}$.

The exact phases present in the stabilized mononitride fuels of this invention have not been conclusively established. Referring to FIG. 1, it will be seen that the mononitride fuel phase composition at temperature may comprie (1) a two-phase region (area *ade*), (2) a three-phase region (area *acd*), or (3) a two-phase region (area *abc*). Across the two-phase regions as the nitrogen content increases the nitrogen equilibrium pressure increases but it is fixed across the three-phase region. Irrespective of the phase makeup of these stabilized mononitride fuels, the U-O-N structure, when formed in accordance with this invention, acts as a buffer or a sink for disposing of excess nitrogen as it becomes available by accommodating the nitrogen within the structure and this precludes reaction of the nitrogen with the cladding material. Referring to FIG. 2, it will be seen that in order for this condition to be achieved in stainless steel clad fuel elements, i.e., prevent nitriding of the cladding, the nitrogen equilibrium pressure over the stabilized uranium or uranium-plutonium mononitride fuel system must be at least as low as the nitrogen equilibrium pressure over the most easily nitrided component of the stainless steel; namely, chromium. The difference in nitrogen pressure over the oxygen-free uranium sesquinitride-uranium mononitride system and chromium nitride-chromium system as shown in FIG. 2 is a factor of at least 20; hence where the stabilized mononitride fuel has a nitrogen equilibrium pressure just equal to that over the chromium nitride-chromium metal system the nitrogen will not react with the chromium due to the fact that the chromium acitvity is less than unity in stainless steel. As nitrogen is released from fuel burnup it will be accommodated within the U-O-N structure to prevent an increase in the equilibrium pressure above the chromium nitride-chromium metal line shown in FIG. 2. It should thus be apparent that in applicants' stabilized mononitride fuels, which exhibit minimal reaction with stainless steel cladding, the U-O-N structure accommodates excess nitrogen as it is formed, preventing the nitrogen equilibrium pressure over the system from rising to a value wherein reaction with the cladding would take place.

The form of the uranium or uranium-plutonium mononitride is not critical and it may be utilized as a powder, dense shards, or microspheres. While the stabilized uranium or uranium-plutonium mononitride fuel may be formed with oxygen-containing uranium mononitride, these fuels may be formed using sol-gel derived uranium (or uranium-plutonium) dioxide, which is then reacated with nitrogen and carbon to form the oxygen-containing uranium mononitride by the following reaction:

$$UO_2 + 2C + \tfrac{1}{2}N_2 \rightleftharpoons UN + 2CO \qquad (1)$$

Where this method is employed the carbon content in Reaction 1 must be controlled in order to get the oxygen-containing uranium mononitride. If excess carbon, i.e., any amount greater than one gram atom carbon/gram atom oxygen, is present, the resulting product is not the mononitride but is a carbonitride. On the other hand, if there is a deficiency of carbon, then the oxygen-containing uranium mononitride is formed. While it is well known that uranium dioxide is easily oxidized and thus may be $UO_{2+x}$ where $x$ is any number greater than zero, the amount of oxygen present in the uranium dioxide can be adjusted to the stoichiometric amount by reduction with hydrogen.

The temperature at which the stabilized U-O-N structure is formed may vary over a wide range. It is important insofar as the temperature parameter is concerned that a high enough temperature be used to ensure that the nitrogen sink be formed thereby achieving the stabilized structure. Temperatures such as to be observed at the clad-fuel interface under reactor service conditions, i.e., about 800° C., are quite suitable for formation of the stabilized U-O-N structure.

As noted hereinbefore, the present stabilized mononitride fuels provide excellent core materials for fast breeder fuel elements, which are clad with stainless steel, due to the stabilization with respect to nitrogen release. Such a fuel element may be fabricated using powder, or sol-gel derived shards as the core material into dense (~95% of theoretical density) elements by cold pressing and sintering the powder using conventional ceramic techniques.

The following examples are provided to explain the invention in greater detail.

EXAMPLE I

Uranium dioxide microspheres (~300-micron diameter), prepared by the sol-gel process, were heated for 22 hours in a carbon tube furnace (1 inch in diameter by 5 inches long) at 1700° C. Nitrogen, at a supply rate of 1 liter/min., was used as a fluidizing gas throughout the experiment. The pressure of nitrogen was one atmosphere. The $UO_2$ microspheres were partially converted to UN by reacting with carbon from the furnace walls.

The microspheres were quenched at 1000° C. per second and examined by X-ray and metallography. An X-ray diffraction pattern of the microspheres revealed three phases of approximately equal intensity. $UO_2$ ($a_0 = 5.4715 \pm 0.0002$), UN ($a_0 = 4.8896 \pm 0.0003$) and a third phase whose X-ray diffraction pattern is identical to that of $U_2N_3$. A photomicrograph of part of the sample also reveals three distinct phases that have the polishing and etching characteristics of $UO_2$, UN, and $U_2N_3$.

This experiment demonstrates that additional nitrogen can be accommodated within a uranium mononitride-uranium dioxide couple over and above that necessary to form uranium mononitride. Accordingly, the reacted structure (U-O-N) can serve as a nitrogen sink and provide a mechanism for disposing of excess nitrogen, as formed. While the exact phases present at 1700° C. have not been conclusively established, one or more U-O-N phases were certainly present in which the nitrogen's tendency to react or escape was was reduced by a factor of 20, since oxygen-free uranium sesquinitride, which has a decomposition temperature at one atmosphere of about 1350° C. is normally unstable at 1700° C. at a nitrogen pressure of one atmosphere.

EXAMPLE II

Establishing that stable cubic uranium sesquinitride can dissolve appropriate amounts of oxygen was demonstrated as follows: about 6 grams of a dried sol consisting of $UO_{2.6}$ (~40 angstroms crystallite diameter) carbon powder (300 angstroms) was reacted by dropping the mixture into a hot bed at various temperatures, fluidized with nitrogen at a flow rate of 1 liter/min. In order to preclude all of the oxygen being used up in the conversion of the uranium dioxide to the carbonitride the samples were removed at various times. The results are given in the accompanying table below.

TABLE

| Sample | Reaction time and temperature | Analysis | | | | Mole ratio (O+N)/U |
|---|---|---|---|---|---|---|
| | | U | O | N | C [a] | |
| 1 | 30 min.,[b] 1,400° C | 89.04 | 3.14 | 5.37 | 1.30 | 1.55 |
| 2 | 30 min., [c] 1,400° C | 88.89 | 1.92 | 6.77 | 2.15 | 1.62 |
| 3 | 17 min., 1,500° C | 89.33 | 2.89 | 5.73 | 1.19 | 1.57 |

[a] Carbon is believed present primarily as free carbon rather than combined in the $U_2N_3$ phase.
[b] Starting material was 75.0 wt. percent U, 9.01 wt. percent C, balance oxygen.
[c] Starting material was 73.7 wt. percent U, 9.76 wt. percent C, balance oxygen.

What is claimed is:

1. A fast breeder reactor fuel element consisting essentially of a fuel core containing an element selected from the group consisting essentially of uranium and plutonium and from 2,000 to 40,000 p.p.m. oxygen, said core comprising three phases containing $UO_2$, UN, and $U_2N_3$, and a stainless steel cladding surrounding said fuel core.

2. The fuel element of claim 1 wherein said fuel core is compacted to a density of about 95% of theoretical density.

3. A method for forming a three-phase composition consisting essentially of $UO_2$-$UN_2$-$U_2N_3$ which comprises heating $UO_x$ where $x$ is a number from 2 to 2.6 in a carbon-lined furnace to a temperature of 1700° C. under a nitrogen atmosphere and quenching the reaction mixture at a rapid rate to room temperature.

References Cited

UNITED STATES PATENTS

| | | | |
|---|---|---|---|
| 3,213,161 | 10/1965 | Craig | 252—301.1 X |
| 3,510,434 | 5/1970 | Weber et al. | 252—301.1 |
| 3,230,177 | 1/1966 | Blum et al. | 252—301.1 |
| 3,472,734 | 10/1969 | Boettcher | 176—91 X |
| 3,208,818 | 9/1965 | Stoops | 23—346 |
| 3,044,946 | 7/1962 | Litton | 252—301.1 X |

CARL D. QUARFORTH, Primary Examiner

R. L. TATE, Assistant Examiner

U.S. Cl. X.R.

252—301.1 R; 264—0.5; 423—251, 253